United States Patent
Milburn, Jr.

[15] 3,645,030
[45] Feb. 29, 1972

[54] BAIT MOVING FISHING BOBBER

[72] Inventor: Raymond E. Milburn, Jr., Route #1, Box 128, Round Lake, Ill. 60073

[22] Filed: Feb. 11, 1970

[21] Appl. No.: 10,571

[52] U.S. Cl............................................................43/26.1
[51] Int. Cl.......................................................A01k 93/00
[58] Field of Search..................43/26.1, 26.2, 19.2, 27.4, 43/43.11

[56] References Cited

UNITED STATES PATENTS 2,758,407   8/1956   Speidell...............................43/19.2
1,251,810   1/1918   Oehler..................................43/26.1

Primary Examiner—Warner H. Camp
Attorney—Barnes, Kisselle, Raisch & Choate

[57] ABSTRACT

A bobber having a hollow spherical float with a spring motor mounted therein driving an actuator rod in a plurality of short, with periodic comparatively long, generally vertical reciprocal movements to impart a lifelike action to a fishing bait or lure connected to the actuator rod.

6 Claims, 3 Drawing Figures

Patented Feb. 29, 1972  3,645,030

INVENTOR.
RAYMOND E. MILBURN, JR.
BY
Barnes, Kisselle, Raisch & Choate
ATTORNEYS

BAIT MOVING FISHING BOBBER

This invention relates to bobbers for fishing and more particularly to a bobber imparting motion to a fishing bait or lure.

Objects of this invention are (1) to provide a device for imparting a lifelike action or movement to an artificial lure or bait for fishing, and (2) to provide a bait moving device of economical construction and assembly.

These and other objects, features and advantages of this invention are disclosed in the following specification and accompanying drawings in which.

Figure 1:
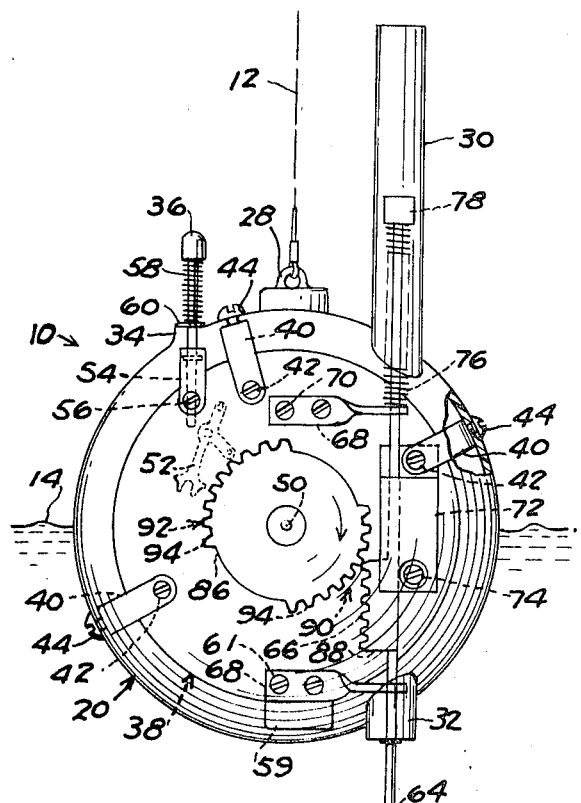
FIG. 1 is a side elevational view of a fishing bobber of this invention illustrating the bobber attached to a fishing line and floating in the water of a lake with an artificial lure connected to the bobber.

Referring to the drawings:

FIG. 1 shows a fishing bobber 10 constructed in accordance with this invention connected to a fishing line 12 of a fishing pole (not shown) and floating in water 14 of a lake. A lure 16 below the surface of the lake is connected to bobber 10 by a leader line 18.

Figure 2:
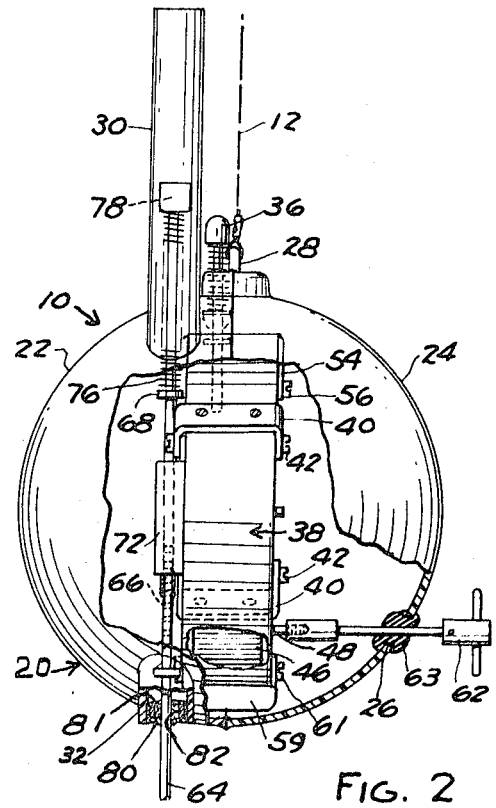
FIG. 2 is a side elevational view at a right angle to FIG. 1 illustrating some of the component parts of the bobber device.

As shown in FIGS. 1 and 2, bobber 10 has a spherical outer shell 20 of semispherical transparent plastic halves 22 and 24 which are joined in a watertight seal at their edges by gluing with an epoxy cement. Shell 20 is large enough to displace sufficient water to provide a float for bobber 10 and lure 16. Shell half 24 has a hole 26 therein to accommodate a winding key and an integral eyelet 28 for connecting fishing line 12. Shell half 22 has integral hollow tubes 30 and 32 which are axially aligned and extend vertically from the upper and lower portion of the shell to provide a housing for a guide rod. Shell half 22 also has a pad 34 with a hole therein to receive a plunger rod 36 for controlling a motor 38 mounted in shell 20. Motor 38 is mounted in shell 20 by U-shaped brackets 40 and screws 42 and 44.

Motor 38 is powered by a helical coil spring 46 connected to a winding shaft 48. Motor 38 has an output shaft 50 and a balance wheel ratchet arm 52 for starting and stopping motor 38. Ratchet arm 52 is controlled by plunger rod 36 mounted and positioned on motor 38 by bracket 54 and screws 56 to engage arm 52 when depressed. Plunger rod 36 is yieldably biased upward and out of contact with arm 52 by a spring 58 bearing on a shoulder of plunger 36 and a washer 60 resting on pad 34. A weight 59 is attached by screws 61 to the bottom of motor 38 to assure that bobber 10 remains in an upright position as illustrated in the drawing when floating in water 14. A key 62 extending through hole 26 in shell 20 is threadably connected to winding shaft 48 for winding up spring 46 of motor 38. A flexible rubber grommet 63 engages in hole 26 and bears on the shaft of key 62 to provide a watertight seal between the shell and the key.

An actuator shaft 64 with a rack 66 extends axially in tubes 30 and 32 and is mounted for generally vertical reciprocal motion by brackets 68 secured to motor 38 by screws 61 and 70. Actuator shaft 64 and rack 66 are restrained from rotation by a generally U-shaped guide 72 secured to motor 38 by screws 42 and 74. Actuator shaft 64 is yieldably biased vertically upward by a spring 76 bearing on upper bracket 68 and an abutment 78 fixed to the upper end of shaft 64. The upper end of tube 30 is closed and in the lower end of tube 32 a latex rubber seal 80 containing a dry powder lubricant 81 and retained by a ring 82 slidably engages shaft 64 to provide a watertight seal between the shaft and outer shell 20. The lower end of shaft 64 has an eye 84 for connecting leader line 18.

Figure 3:
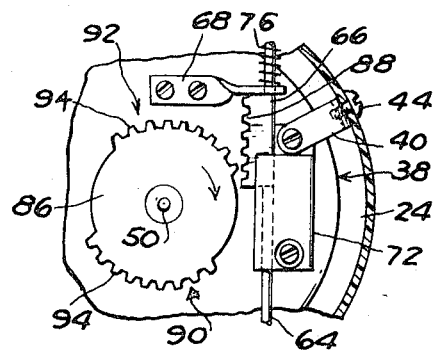
FIG. 3 is a fragmentary side elevational view illustrating the position of a gear and rack of the bobber with the rack in the up position.

As shown in FIGS. 1 and 3, output shaft 50 of motor 38 is connected to a driving gear 86 positioned to engage with teeth 88 of rack 66. Gear 86 has two circumferentially spaced tooth segments 90 and 92 each containing six or seven more teeth 94 than the number of teeth 88 on rack 66.

In operation, key 62 is manipulated to wind up spring 46 of motor 38. With the bobber attached to both fishing line 12 and lure 16 plunger rod 36 is momentarily depressed to strike balance arm 52 of motor 38 thereby starting the motor. After the motor is started lure 16 and float 10 are placed in water 14 of a lake. Motor 38 rotates gear 86 clockwise (as viewed in FIG. 1) causing teeth 94 of one of the gear segments to engage with teeth 88 of rack 66 thereby moving the rack and shaft 64 vertically downward against the bias of spring 76 (as shown in FIG. 1). After rack 66 has been moved fully vertically downward, the remaining six or seven teeth of one of the segments of the gear sequentially engage with the uppermost tooth on the rack to momentarily move the rack downward and then allow it to jump slightly upward under the bias of spring 76 to engage the next tooth. This imparts a slight oscillatory movement through shaft 64 and line 18 to lure 16 (as indicated in phantom line at 96). After the last tooth of one of the gear segments disengages from the top tooth of rack 66, the rack is moved fully upward into engagement with upper bracket 68 by spring 76 (as shown in FIG. 3). When rack 66 moves vertically upward it imparts through shaft 64 and line 18 a substantial jerk to lure 16 moving it to phantom line position 98. As rack 66 moves vertically upward motor 38 continues to rotate driving gear 86 so that the other gear segment engages the rack (as shown in FIG. 3) and moves rack 66 and shaft 64 vertically downward to allow lure 16 to drift back to the solid line position shown in FIG. 1 where the lure is again oscillated due to the action of the last six or seven teeth in the other gear segment and then jerked rapidly vertically upward. This cycle is repeated until motor 38 becomes unwound. The movement of shaft 64 and lure 16 is generally characterized as a plurality of short vertical reciprocal movements with a periodic, comparatively long reciprocal movement. In one device embodying this invention the actuator rod goes through a cycle of seven short reciprocal movements each with a stroke of about 0.1 of an inch and a long reciprocal movement with a stroke of about 1.0 inch every 8 seconds for about 10 minutes before the motor becomes unwound.

What is claimed as new is as follows:

1. A bait moving fishing bobber comprising: a float, actuator means carried by said float for movement with respect thereto and adapted to be connected to a bait through a line, a motor carried by said float, a drive means carried by said float, driven by said motor and operably connected to said actuator means for imparting a plurality of short, generally vertical reciprocal movements to the bait connected to said actuator means, and means encasing said motor, actuator means, and drive means.

2. The bait moving fishing bobber of claim 1 in which said drive and actuator means also provides periodic comparatively long, generally vertical reciprocal movements to a bait connected to said actuator means.

3. The bait moving fishing bobber of claim 2 in which said float is hollow and encases said motor, drive means, and actuator means, said motor is a spring driven motor, said drive means comprises a gear having at least one segment with a plurality of teeth, and said actuator means comprises a rack with a plurality of teeth engageable with said gear, said rack having fewer teeth than the teeth in said segment of said gear, and a rod connected to said rack and carried by said float for generally vertical reciprocal motion.

4. The bait moving fishing bobber of claim 3 in which said gear has two segments each with at least six more teeth than said rack.

5. The bait moving fishing bobber of claim 2 in which said drive means comprises a gear having at least one tooth segment with a plurality of teeth thereon and said actuator means comprising a rack with a plurality of teeth operably engageable with said teeth of said gear, said rack having fewer teeth than the number of teeth in said tooth segment of said gear.

6. The bait moving fishing bobber of claim 1 in which said drive means comprises a first gear means driven by said motor and said actuator means comprises a yieldably biased second gear means driven by said first gear means.